United States Patent [19]
Judd et al.

[11] Patent Number: 5,265,725
[45] Date of Patent: Nov. 30, 1993

[54] MULTIPLE MEDIA STORAGE CONTAINER AND SYSTEM

[75] Inventors: Thomas W. Judd, Peterborough, N.H.; Jon Rossman, Chelmsford, Mass.

[73] Assignee: Curtis Manufacturing Company, Inc., Jaffrey, N.H.

[21] Appl. No.: 916,900

[22] Filed: Jul. 20, 1992

[51] Int. Cl.⁵ .................... B65D 85/57; B65D 85/575
[52] U.S. Cl. ................................ 206/387; 220/4.24; 220/533; 206/454; 206/519
[58] Field of Search ............ 220/4.21, 4.24, 533, 220/552; 206/445, 454, 444, 387, 519

[56] References Cited

U.S. PATENT DOCUMENTS

| | | | |
|---|---|---|---|
| 3,353,704 | 11/1967 | Belcher et al. | 220/533 X |
| 3,415,585 | 12/1968 | Morris | 312/261 |
| 3,420,402 | 1/1969 | Frater et al. | 220/97 |
| 4,061,228 | 12/1977 | Johnson | 206/454 |
| 4,079,835 | 3/1978 | Kendig | 220/4.24 X |
| 4,111,303 | 9/1978 | Compton | 206/519 X |
| 4,555,024 | 11/1985 | Voss et al. | 206/454 |
| 4,593,816 | 6/1986 | Langenbeck | 206/425 |
| 4,602,715 | 7/1986 | Sarver et al. | 220/533 X |
| 4,629,066 | 12/1986 | Howard | 206/387 |
| 4,640,416 | 2/1987 | Northrup et al. | 206/425 |
| 4,643,306 | 2/1987 | Ryan | 206/425 |
| 4,712,679 | 12/1987 | Lowe | 206/387 |
| 4,779,752 | 10/1988 | Vallee et al. | 220/22.1 |
| 4,781,423 | 11/1988 | Muenzer et al. | 312/183 |
| 4,796,755 | 1/1989 | Ardenti | 206/387 X |
| 4,819,795 | 4/1989 | Swaney | 206/273 |
| 4,901,876 | 2/1990 | Box | 220/22.3 |
| 5,009,312 | 4/1991 | Leben | 206/387 |
| 5,105,947 | 4/1992 | Wise | 206/519 |

FOREIGN PATENT DOCUMENTS 2727692 11/1978 Switzerland.

*Primary Examiner*—Steven M. Pollard
*Attorney, Agent, or Firm*—Richard P. Crowley

[57] ABSTRACT

A multiple-media storage container and system for the organization and storage of cassettes, video cartridges and other informational media. The storage container includes an upper and a lower section adapted to be hinged together and have the upper section move between an open and a closed position. The sections are nestable within each other and secured together in pairs, prior to use by break-away tab elements. The nested, secured sections are arranged for shipping and displaying in a plurality of vertically stacked, nested pairs.

25 Claims, 7 Drawing Sheets

MULTIPLE MEDIA STORAGE CONTAINER AND SYSTEM

BACKGROUND OF THE INVENTION

A wide variety of storage containers and systems has been suggested for the storage of a variety of magnetic storage elements, or other multiple-media elements, to include, but not be limited to, VHS video cassettes, standard audio cassettes, Beta cassettes, floppy discs, compact discs, and particularly a wide variety of single cartridges for computer-video games which contain software and other information-storage devices. There exists a need to provide for the effective organization and storage of a wide variety of multiple-media elements, particularly in video cartridges of different sizes. A storage container also should provide for the easy organization and storage of the media, and permit easy and ready access to the stored media.

It is, therefore, desirable to provide for a new and improved multiple-media storage container and system which provides for the effective indexed organization and storage of multiple-media elements in a wide variety of sizes and in a single storage container, and yet which storage container may be manufactured at low cost and effectively and easily shipped, displayed and purchased by the user.

SUMMARY OF THE INVENTION

The invention relates to a multiple-media storage container, system and method, and in particular concerns a multiple-media video-cartridge or cassette storage-container system and method.

The multiple-media storage container of the invention provides for the storage of a plurality of media elements in the storage container, such as audio or visual media elements, and more particularly video cartridges and cassettes, and which storage container comprises a first lower and a second upper plastic, molded housing section, typically half sections, each section having a bottom surface and upright sides, generally slightly tapered sides, and a front and back, and each forming an open tray-like structure. The storage container includes means to secure together the first and second housing sections, to form an enclosed box-like housing or a storage container having an interior space for the storage of the media elements organized and stored therein. In one embodiment, the first lower housing section has an outwardly extending, short, peripheral skirt around the upper side and hinge means, while the second upper housing section also includes a downwardly extending, rounded, peripheral skirt which includes, at the back end, means to snap in and form hinge elements with the back end of the lower first housing section. The hinge means provides for the hinge movement of the first and second housing sections between a closed position and an open position, and wherein the second housing element also includes, at the front edge, a snap-in clasp which, in the closed position, snaps against the skirt of the lower front section of the lower housing, to place the upper and lower housing sections in a snapped-together, closed position. The snap clasp may be overcome by the user's upwardly and outwardly raising by hand-pressure the downwardly extending skirt of the upper housing section, to overcome a clasp indent and to raise the upper section easily into an open position for the insertion of media elements.

The storage container also includes the first and second housing sections configured and adapted to be nested together at least partially one within the other, but typically the upper housing section is substantially nested within the lower housing section. In one embodiment, the nesting is accomplished by tapering slightly the upright sides of the first and second housing sections, to permit the nesting arrangement. When in the nesting condition, the first and second housing sections have a reduction in overall height, so that at least 50% to 75% of the height of the upper housing section is nested within the lower housing section. The nesting arrangement of the upper section within the lower section is important in the shipping, displaying and using of the multiple-media storage container, in that the nesting together of the upper and lower sections in pairs, and the nesting of one pair within the other pair in a vertical, nesting, multiple-pair, stacked arrangement, permits the easy shipment of the storage containers after manufacture, and the easy display for purchase of the stacked storage containers, so as not to consume important retail-consumer shelf space, and yet provides for the display and easy selection of the paired product by the user. The nesting arrangement of multiple pairs, one within the other, also reduces the cost of separately packaging the pairs, or separately packaging the multiple-stacked pairs, so that the retailer, on receiving the vertically stacked, nested, multiple pairs of the storage containers, may immediately place them on display for purchase.

In another embodiment and importantly, the housing sections also include means to retain together the upper and lower housing sections, so as to form a single pair package and to avoid mixing improperly the upper and lower housing sections. The retaining means permits the customer to pick a retained pair of upper and lower housing sections together; for example, from the top of the vertically stacked multiple pairs of storage containers in the nesting arrangement. In one embodiment, the retaining means includes a plurality, such as a pair, of plastic, break-away, snap-in clamp arrangements on either side of a housing section and secured to the section in a weakened or break-away manner, such as to the peripheral skirt of the lower housing section. The clamp is hingedly connected, so that it may have the upper portion of the tab or clasp snapped into the upwardly projecting sides of the upper housing section in the nested arrangement, so as to retain together the first and second housing sections in a nested pair arrangement. After selection of the paired sections, a user merely needs to break away and discard the snap-in tabs. The tab is removed by pushing outwardly and overcoming an indent on the end of the tab and then broken away at its lower hinged edge and discarded. Thus, the vertically stacked upper and lower housing sections may be retained together in pairs alone or within the generally vertically stacked, multiple-pair arrangement, to provide important advantages in shipping, packaging, displaying and using.

Generally the lower housing section comprises a nesting-stop means within the housing section, and also the upper housing section may include a nesting-stop means, to provide a predetermined stop and a defined nesting space between the nested surfaces of the first and second housings. The nesting-stop means may include a plurality of generally uniformly spaced, inwardly directed, short, projection elements extending from the interior surface slightly inwardly and uniformly positioned on the interior of each side of the upper and lower housings. The nesting-stop means should not be too high, since such height then would reduce the number of multiple pairs which may be stacked vertically in any retail display. The height of the nesting-stop means or tabs is to provide for a defined storage space of sufficient height; for example, ½ to 2 inches, between the upper and lower housings, to provide for the storage of a plurality of thin, removable, partition elements, such as index cards, which are to be employed in the organization and storage of the media elements in the container.

In another important embodiment, the first lower housing section has a bottom surface characterized by slotted openings, to receive removable partition elements therein, such as a plurality of generally uniformly spaced-apart, parallel, first and second slotted openings, which first slotted openings extend substantially from the front to the back ends of the first lower section, and the second slotted openings which extend substantially from one to the other sides thereof. The first and second slotted openings are perpendicular to the back and front sides, to form a plurality of generally rectangular and square areas on the bottom surface of the first lower housing section.

The storage container also optionally includes therewith a plurality of removable partition means, such as thin, index-type cards, generally having an upward tab section therein, so that the media elements may be subdivided by the cards and information relative to each media placed on the outstanding upward tab. The thin partition elements are inserted within the elongated slotted openings, either all parallel from the front to back edges, or all parallel from side to side, or a mixture or combination thereof, depending upon the subdivision desired within the lower first housing section and the size of the particular media elements to be placed therein. This slotted-opening arrangement, extending from back to front and from side to side, and with a line of generally square areas on one or both sides running from front to back, and generally uniform rectangular areas running from front to back, provides for an easy subdivision and storage of media of various types, sizes and shapes.

Generally the multiple-media storage container is wholly formed from a hard, injected-molding-type plastic. After manufacture, a plurality of partition elements are then placed flat on the slotted bottom surface of the first housing section, and then the upper housing section placed in a nesting arrangement within the first housing section, and the break-away tab or clamps secured upwardly to snap into each side edge of the upper housing section, to retain together the first and lower housing sections as a defined pair, to form later a storage container. The retained-together pair of the upper and lower housing sections, with the thin partition elements or index cards located in the space between the bottom surface of the upper housing section and the upper section of the lower housing section, then may be stacked together vertically, to form a vertically stacked arrangement of multiple pairs, which are easily shipped to a store or retail outlet, and which then may be placed on sale, without the need for packaging, and with the user's merely removing the upper pairs of each vertical stack. This vertically stacked arrangement of multiple pairs and the securing together of the multiple pairs provide for easy, efficient and economical space-saving in the method of shipment and display of the resulting product.

The invention will be described for the purposes of illustration only, in connection with certain embodiments; however, it is recognized that those persons skilled in the art may make various changes, modifications, additions and improvements to the illustrated embodiments, without departing from the spirit and scope of the invention.

DESCRIPTION OF THE EMBODIMENTS

Figure 1:
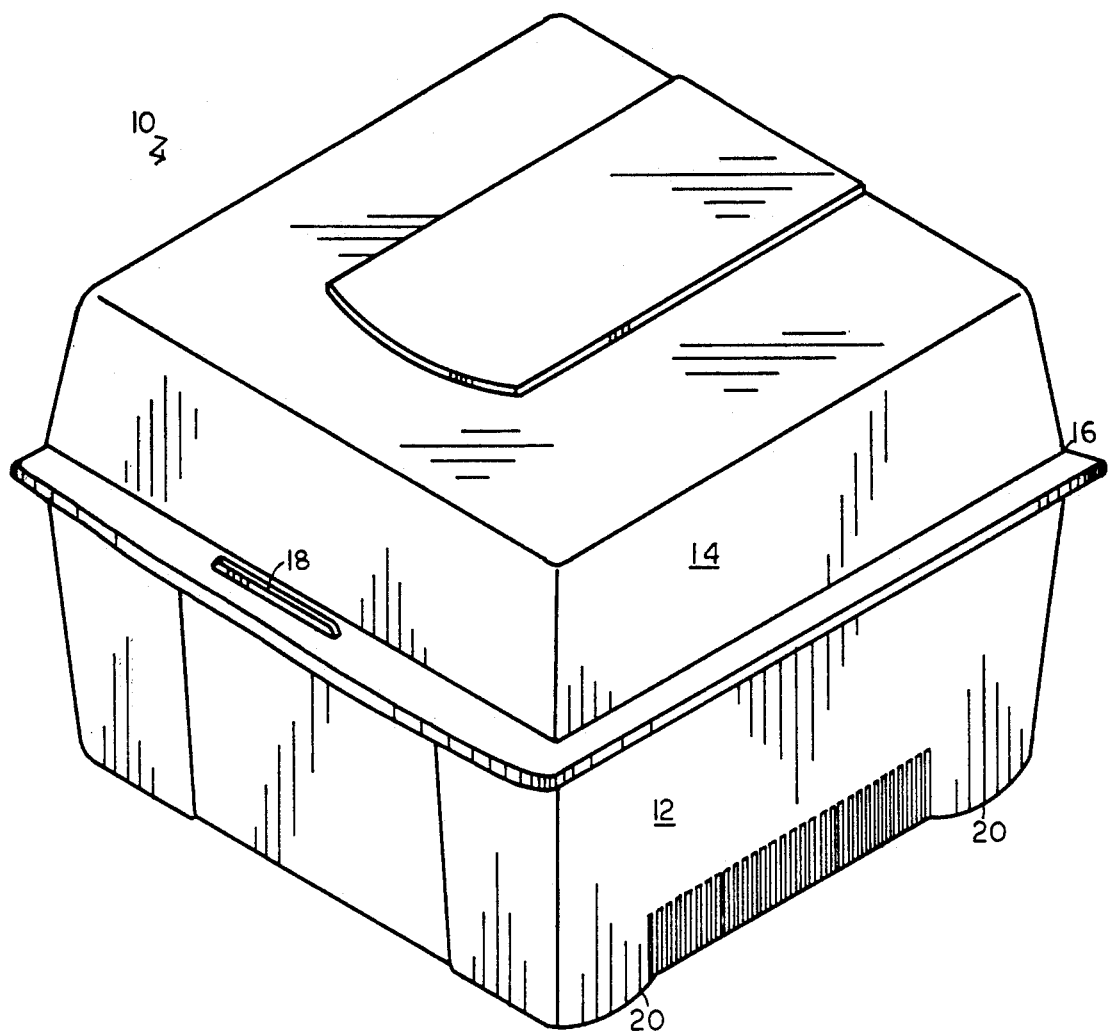
FIG. 1 is a perspective view from above of the storage container of the invention shown in a closed, storage-use position.
Figure 2:
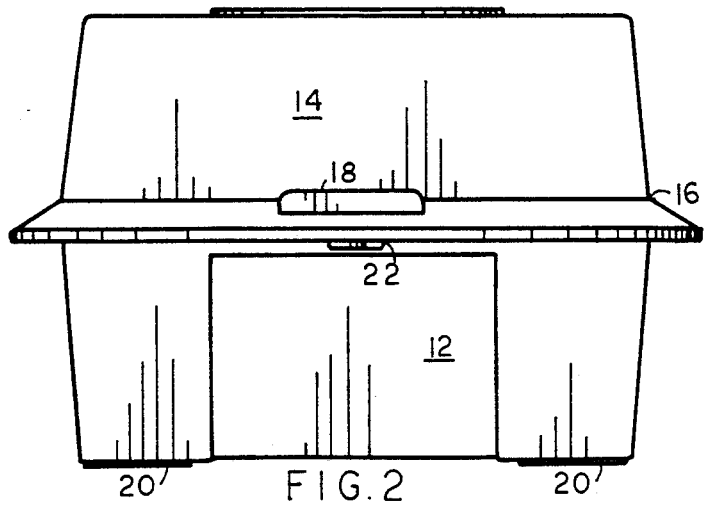
FIG. 2 is a front elevation view of the storage container of FIG. 1.
Figure 3:
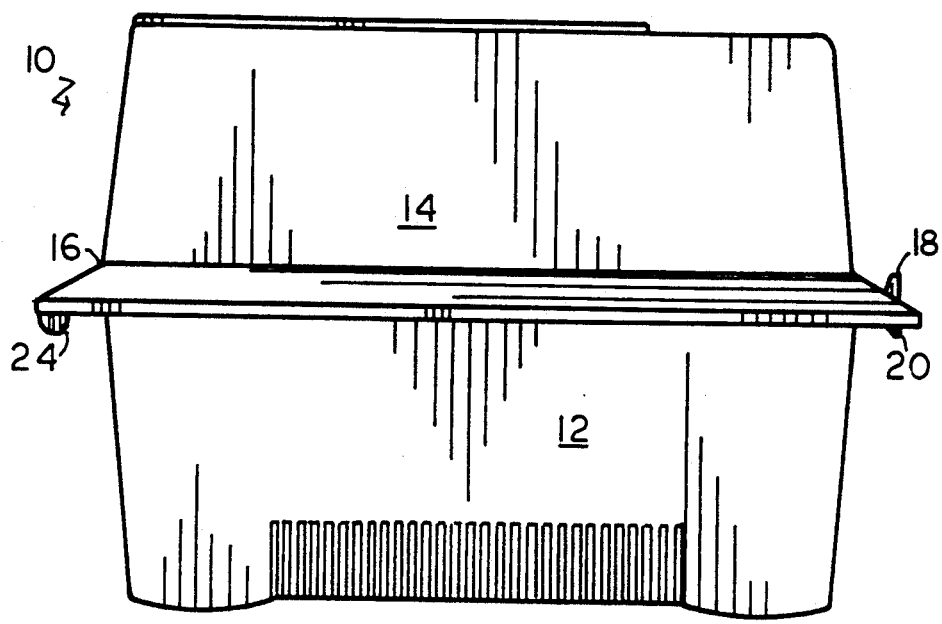
FIG. 3 is a side elevation view of the storage container of FIG. 1.
Figure 4:
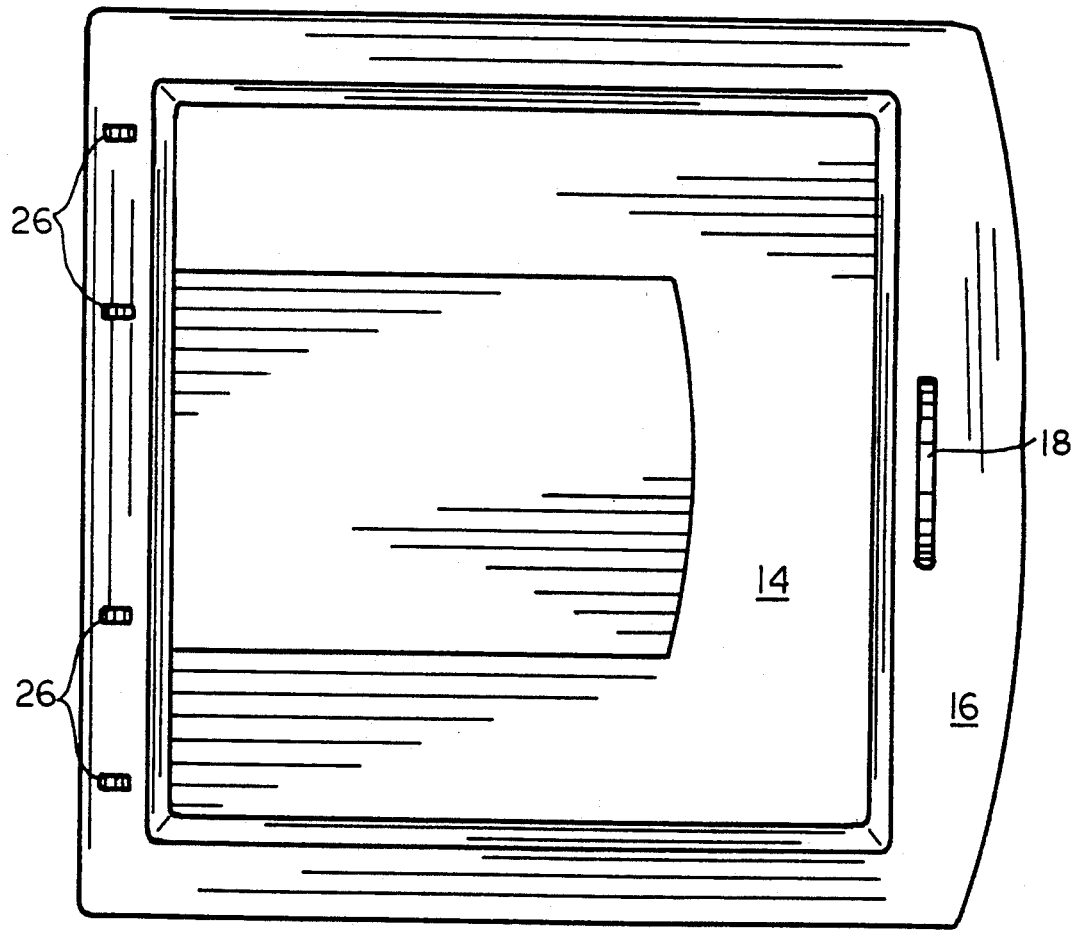
FIG. 4 is a top plan view of the storage container of FIG. 1.
Figure 5:
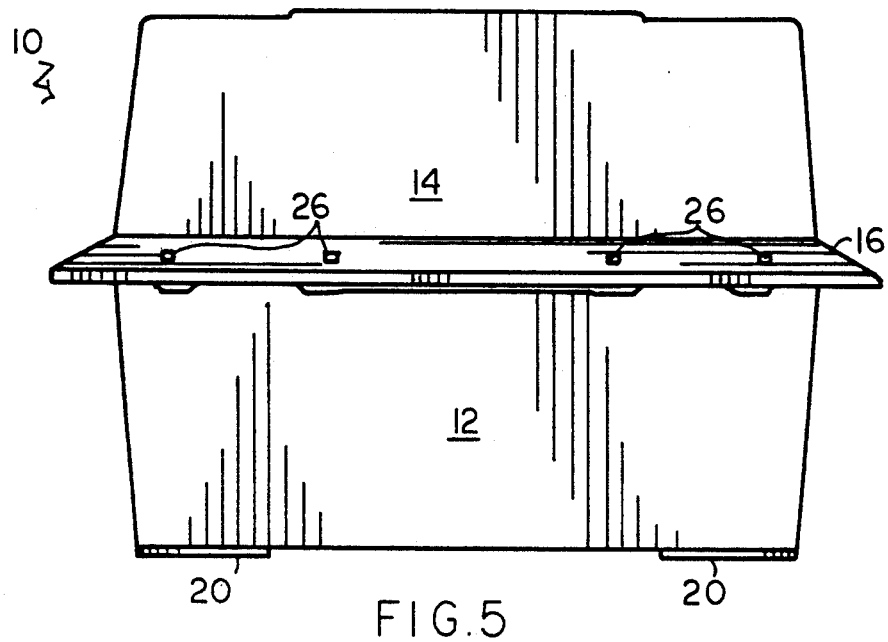
FIG. 5 is a back elevation view of the storage container of FIG. 1.
Figure 9:
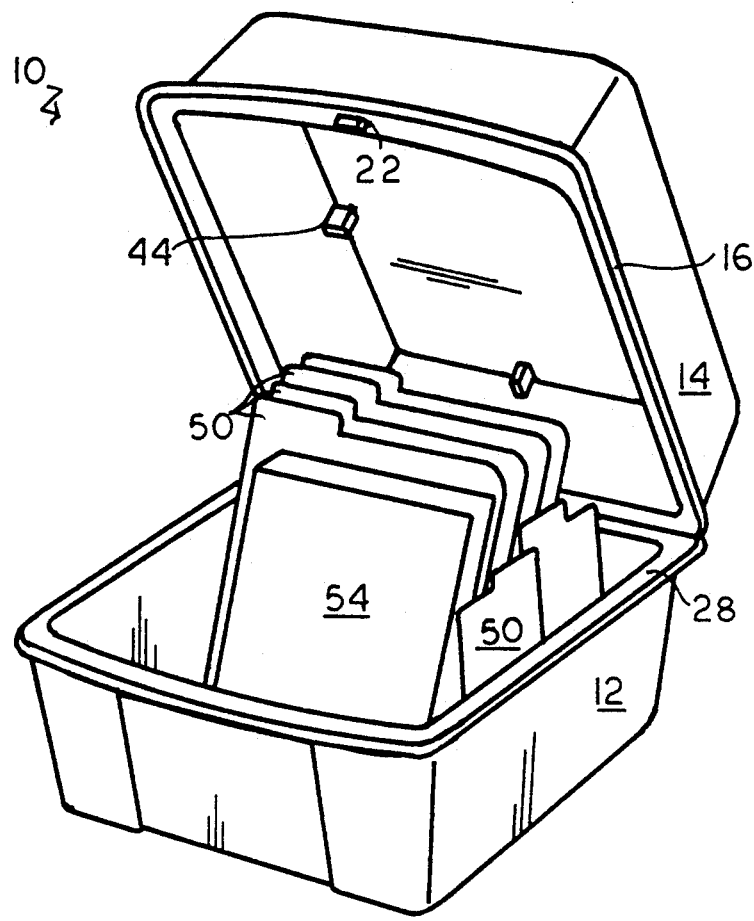
FIG. 9 is a perspective view from above of the storage container in an open use position, with index dividers illustrated in broken lines.

With particular reference to FIGS. 1-9, there is shown a multiple-media storage container 10 composed of a lower housing section 12 and an upper housing section 14, the storage container 10 composed of a hard, molded-type plastic material, and typically with the upper and lower housing sections representing one-half sections of the container 10. The storage container 10 is illustrated in a closed position in FIG. 1, providing for the storage of a plurality of cassettes, videos or other media elements therein in a closed, stored condition. The upper housing section 14 includes a peripheral, slightly downwardly extending skirt 16, having an upwardly raised handle 18 on the front edge thereof. The lower housing section 12 is molded, to provide for generally rounded, separate feet 20 at each corner thereof. The upper housing section 14 includes a downwardly extending, snap-in-type clasp 22, having a short outer lip at the outer end which is adapted to be snapped into and secured against the peripheral, lower, outwardly extending skirt 28 of the lower housing section 12. The lower housing section contains a molded hinge 24 on the back edge of the upper section 14. In use in the closed storage position of the container 10 in FIG. 1, the snap-in clasp 22 snaps against and in a closed, snap-in relationship with the front edge of the lower skirt element 28. The upper housing section 14 includes hinge-projecting pin elements 46, to be received into the hinge elements 24 in a the lower housing section 12, so as to permit the upper and lower housing sections 14 and 12 to move between a closed storage position, as illustrated in FIG. 1, and an open hinged position, as illustrated in FIG. 9, with the hinge projection molded and with molding holes 46 as shown in the upper housing section 14.

Figure 6:
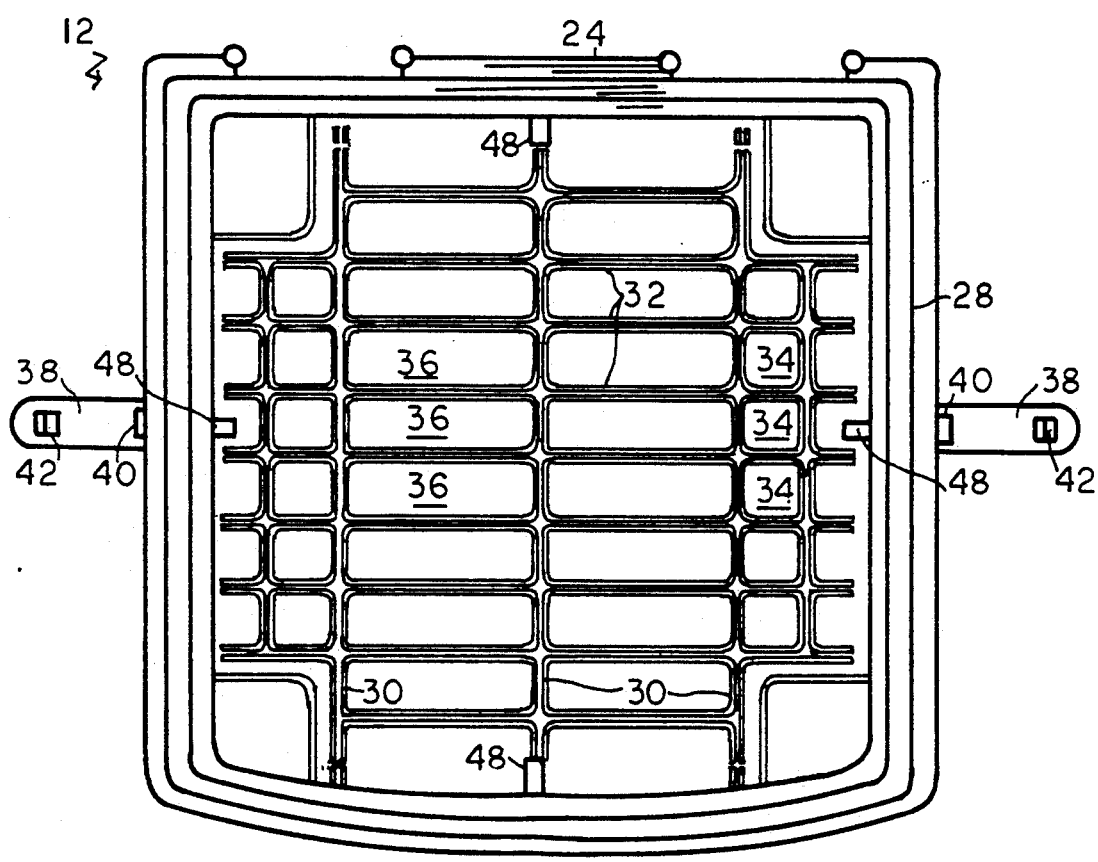
FIG. 6 is a bottom plan view of the storage container of FIG. 1.
Figure 7:
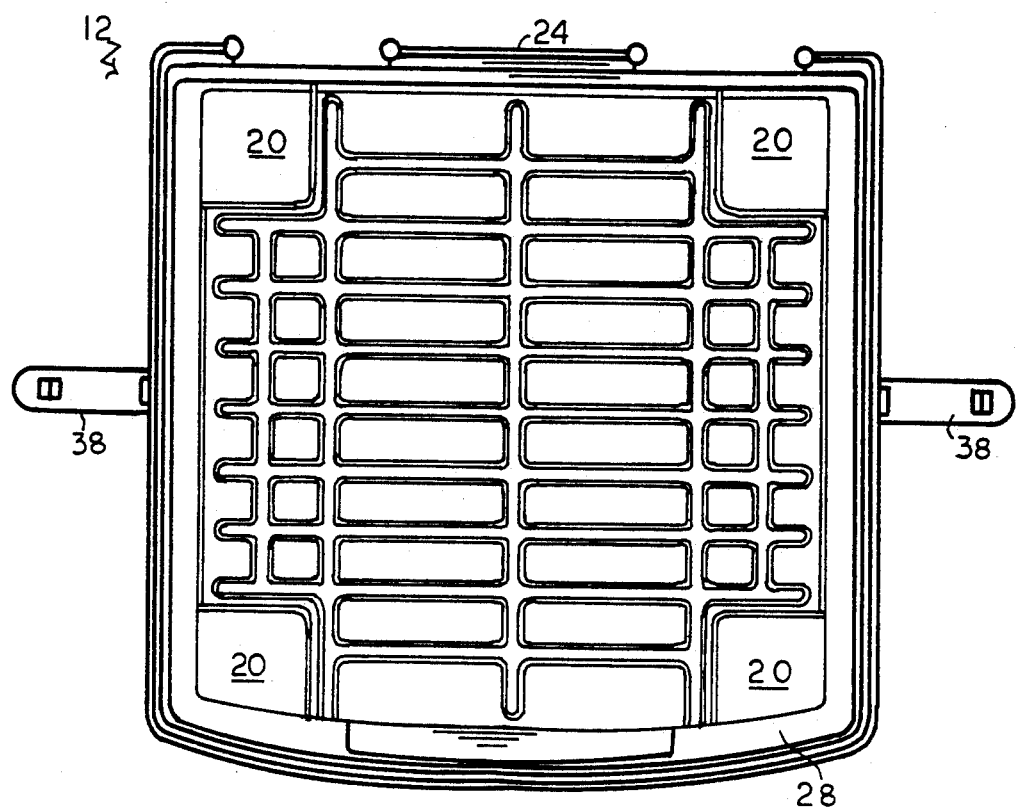
FIG. 7 is a top plan view of the inside of the bottom section of the storage container of FIG. 1.
Figure 8:
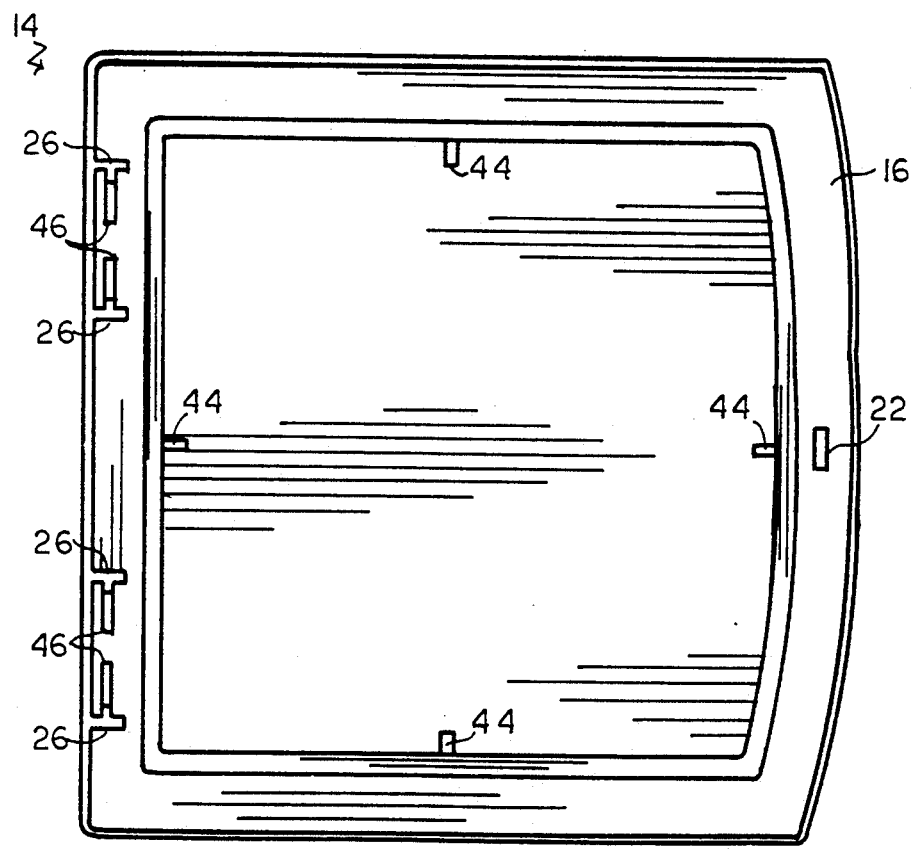
FIG. 8 is a top plan view of the inside of the top section of the storage container of FIG. 1.

With particular reference to FIG. 6, there is shown, on the inner bottom surface of the lower housing section 12, a plurality of generally uniform, parallel, elongated, first slotted openings 30 extending from the front to the rear of the housing section 12, and a plurality of second, elongated, slotted openings 32 extending substantially from side to side. The openings 30 and 32 are adapted to provide for the introduction into the slotted openings of a plurality of thin partition elements 50, such as index cards, illustrated more particularly in FIG. 9, to provide for the subdivision of the lower housing section 12 into areas for the storage of cassettes, cartridges 54 or the like. The arrangement of the first and second slotted openings 30 and 32 provides for a plurality, from front to back, of square areas 34 and a plurality, from front to back, of rectangular areas 36, as illustrated more particularly in the top plan view of the inside of the lower housing section 12 shown in FIG. 6. The bottom plan view of the lower housing section 12, as illustrated in FIG. 7, illustrates the bottom surface as derived from the plastic molding operation, which, of course, may vary.

Figure 10:
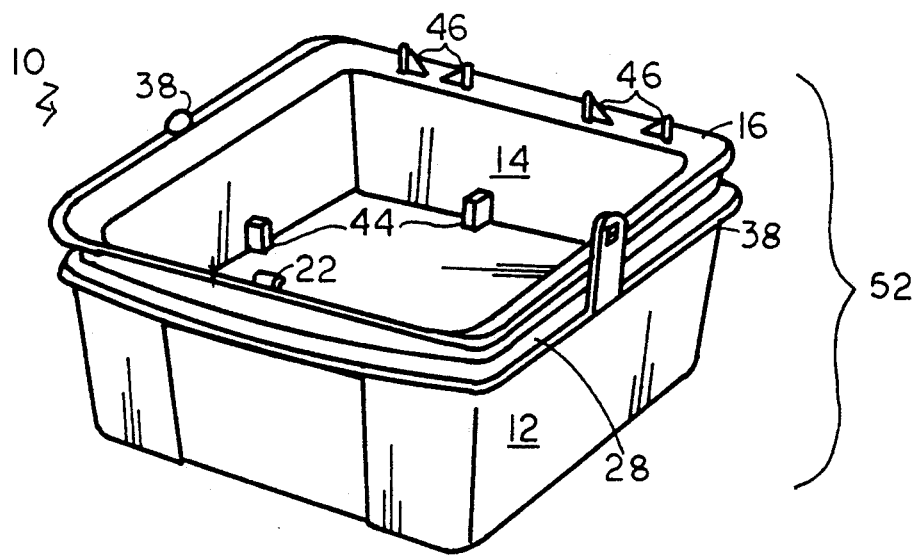
FIG. 10 is perspective view from above of the top section of the storage container nested within and retained with the bottom section in a shipping, displaying, storing and nonuse position.
Figure 11:
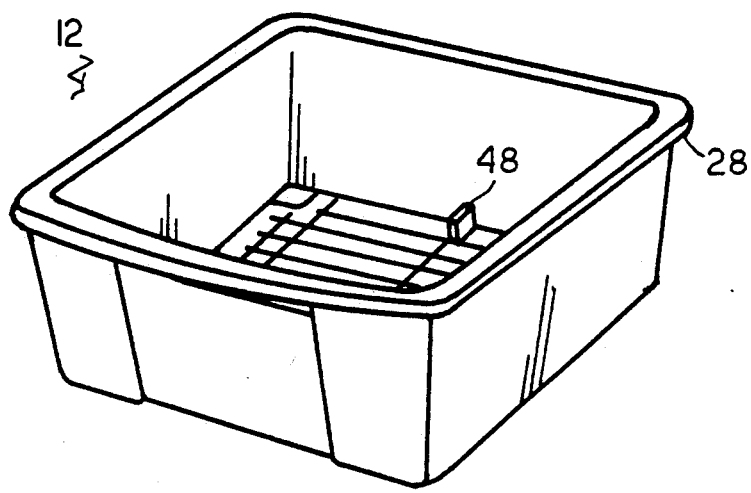
FIG. 11 is a perspective view from above of the bottom section of the storage container of FIG. 1.
Figure 12:
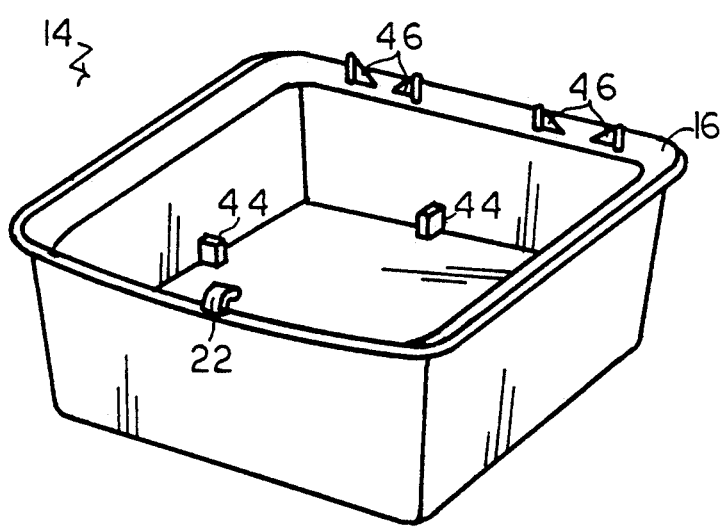
FIG. 12 is a perspective view from above of the top section of the storage container of FIG. 1.

The lower and upper housing sections 12 and 14 have generally slightly tapered, outwardly extending sides which form an open tray-like or box-like enclosure for the housing sections 12 and 14, and which include, in one embodiment, a built-in, molded, hinged, break-away tab element 38 extending from each side of the lower housing section 12 and generally intermediate thereof from the upper edge of the skirt 28, and which break-away tab 38 includes a mechanically weakened or less-thick plastic section 40, which enables a user to break away the hinged tab, and a clasp snap-in section 42 with a lip, so that the break-away tab may be connected hingedly through 40 and swung upwardly, to latch against the upper skirt element 16 of the upper housing section 14, when the lower and upper housing sections 12 and 14 are placed in a nesting, stacking arrangement, as shown particularly in FIG. 10.

On the inside of the lower housing section 12 and upper housing section 14, there are nesting stops of inside projections 44 and 48 extending from the internal wall surfaces of the lower and upper housing sections 12 and 14, which projection stops 44 and 48 are designed to provide for a defined space between the surfaces of nesting pairs of housing sections. In the nesting arrangement, as illustrated in FIG. 10, the upper housing section 14 is nestingly stacked vertically with the lower housing section 12, and with the projection stops 48 in the lower housing section 12 resting against the top surface of the nested, upper housing section 14, and defining an interior space. The partition elements 50, typically illustrated as index-type cards of about 5¼ and 3½ inches in width, and with index tabs on the top, are placed in laid-down condition in the defined space between the lower and upper housing sections 12 and 14, when in the nesting arrangement as shown in FIG. 10, and inserted in use in the slotted openings, as shown in use in FIG. 9.

Figure 13:
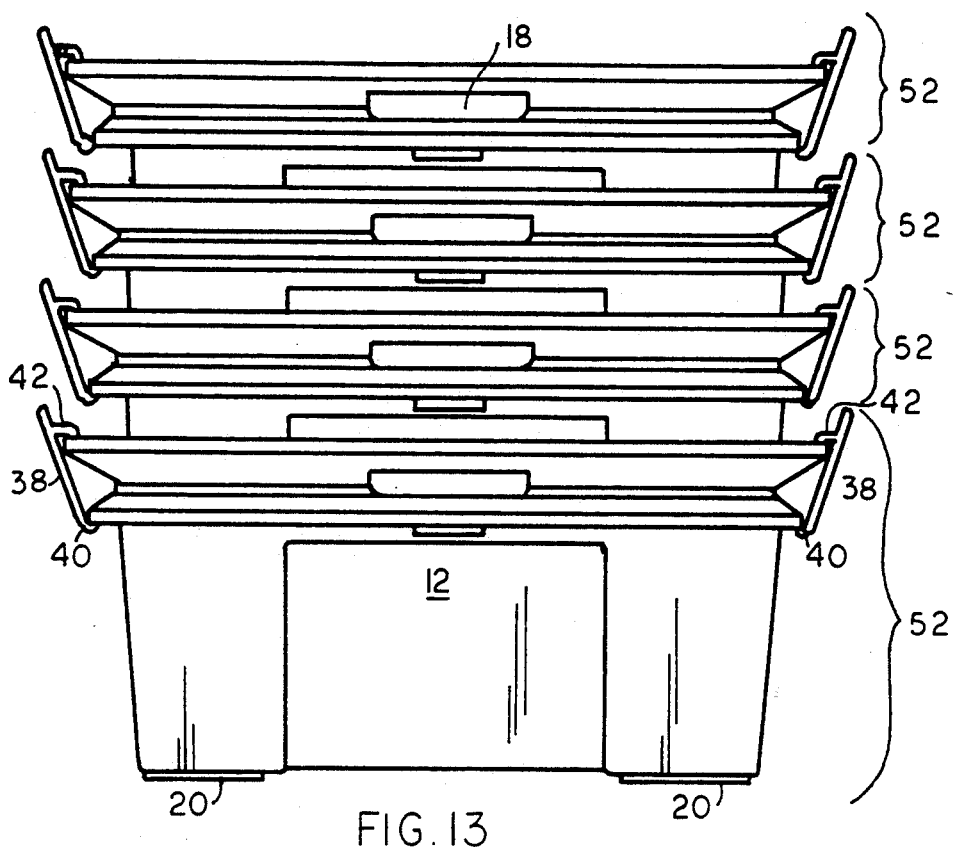
FIG. 13 is a top plan view of multiple pairs of the nested storage container of FIG. 1 shown in a vertically stacked nested relationship, with the upper and lower housing sections of each nested storage container retained together.
Figure 14:
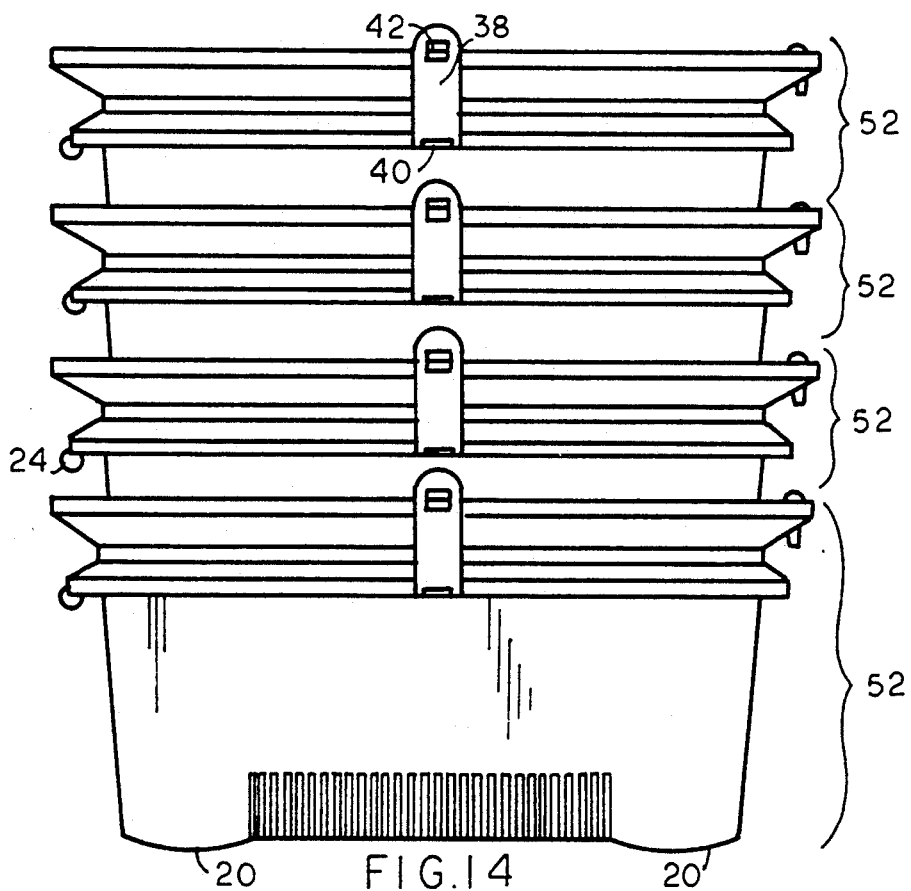
FIG. 14 is a side plan view of the multiple pairs of nested storage containers of FIG. 13.

With particular reference to FIGS. 10, 13 and 14, there is illustrated the lower and upper housing sections 12 and 14 in a nested pair arrangement 52, the upper and lower housing sections secured together through the break-away tab element 38 on either side of the lower housing section 12 and connected to the upper housing section 14. This arrangement provides for a user to pick up immediately and use the combination of the upper and lower housing sections, and subsequently to break away the tabs, and then to employ the upper and lower housing sections 12 and 14 in a snap-in arrangement of the hinges, to form a storage container 10, as described and illustrated. This arrangement of nested upper and lower housing sections retained together provides for the upper and lower housing sections to be retained together for use by a user, and also considerably reduces the need to provide for separate packaging, and to reduce the cost of shipping and displaying of the pair 52.

FIGS. 13 and 14 illustrate the paired sections 52, wherein there are multiple pairs 52 stacked one within the other pair in a vertically stacked arrangement. This is an important aspect of the invention, since the pairs 52 of the lower and upper housing sections 12 and 14 then may be stacked vertically, after manufacture, for shipment to a distributor or retailer, and then the distributor or retailer then merely may stack them, which saves valuable store and retail shelf space, while the ultimate consumer merely may select the secured together, upper and lower housing sections, by taking one housing section from the top of the vertically stacked, nested arrangement, as illustrated in FIGS. 13 and 14.

As described and illustrated, the multiple-media storage container and system provide for many and unique advantages in the ease of manufacture, shipment, storage and use of a storage container adapted to receive media elements of various sizes.

What is claimed is:

1. A multiple-media storage container for the storage of media elements therein, which storage container comprises:
    a) a first lower and a second upper plastic, molded, housing section, each having a bottom surface, upright sides and front and back ends, and each forming an open tray-like structure;
    b) means to secure together the first and second housing sections, to form an enclosed, box-like, storage container for the storage of media elements therein;
    c) the first and second housing sections configured and adapted to be nested together, one within the other, in a shipping and displaying condition;
    d) the first lower housing section having a bottom surface characterized by a plurality of generally uniformly spaced-apart, parallel, first and second, thin, slotted openings, which first slotted openings extend substantially from the front to the back ends, and the second slotted openings extending substantially from the one to the other sides, the first and second slotted openings generally perpendicular, respectively, to the front and back ends and the sides, to form a plurality of generally rectangular, slotted boundary areas on the bottom surface of the first lower housing section, each of the slotted openings adapted to receive therein a removable partition element, to form a plurality of desired divided sections, to accommodate a plurality of media elements to be stored in the storage container; and e) a removable retaining means to retain the first and second housing sections in a stored, nesting relationship which comprises a plurality of hingedly connected, breakaway, plastic tab elements on one of the housing sections and adapted to clamp onto the edge of the other housing section to retain the first and second housing as nested pairs, the tab elements adapted to be broken away by the user when the first and second housing section are removed from the nesting relationship.

2. The container of claim 1 wherein the first and second housing sections are characterized by tapered sides, to permit the nested arrangement of the first and second housing sections within each other.

3. The container of claim 2 wherein the first and second housing sections comprise a first top and second half section, each generally rectangular in shape.

4. The container of claim 1 which includes nesting-stop means within the first or second housing section, or both, to provide a predetermined stop and nesting space between the first and second housing sections, when in a nesting relationship.

5. The container of claim 4 wherein the nesting-stop means comprises a plurality of generally upright projections extending from the interior side surfaces of the sides of the housing.

6. The container of claim 1 wherein the means to secure together the first and second housing sections, to form an enclosed box-like storage container, comprises a hinge means, to place the first and second housing sections in a hinged relationship between an open and a closed position.

7. The container of claim 6 which includes a clasping means, to secure together the hinged housing sections in a closed storage position.

8. The container of claim 1 wherein each of the first and second housing sections has an outwardly flared, peripheral skirt about the upper edge of each of the housing sections.

9. The container of claim 1 wherein the first lower housing section includes a plurality of slotted boundary square areas extending in a row on either side from the front to the back of the first housing section, and which includes a plurality of generally rectangular, slotted, boundary areas extending from the front to the back in the generally central portion of the bottom surface of the lower housing section.

10. The container of claim 1 which includes a plurality of partition elements adapted to be inserted into the slotted openings in the bottom surface of the first housing section, to form a plurality of divided compartments, to receive media elements for organization and storage therein in said divided compartments.

11. The container of claim 10 wherein the partition elements comprise a plurality of index cards, some of the cards having a width of about 5¼ inches and some of the cards having a width of 3½ inches, each of the index cards adapted to fit within slotted openings, to provide a plurality of divided compartments to receive media elements having a width of about 5¼ and 3½ inches.

12. The container of claim 10 which includes a plurality of media elements stored within the divided compartment of the storage container.

13. The container of claim 1 wherein the second upper housing section is nestingly arranged within the first lower housing section.

14. In combination a plurality of vertically stacked and removably retained pairs of first and second housing sections of claim 1 vertically stacked in a nesting relationship, for shipping, displaying or point-of-sale purposes.

15. A multiple-media storage container for the storage of a plurality of media elements, particularly video and game cartridges of different sizes, which storage container comprises:

a) a first lower and a second upper, plastic, molding housing section, each section having a bottom surface and upright tapered sides, to form an open tray-like structure, each of the first and second housing sections forming about one-half of the storage container;

b) means to secure together the first and second housing sections, to form an enclosed, box-like storage container for the storage of media elements therein;

c) the lower housing section having a bottom surface characterized by a plurality of slotted openings, the slotted openings adapted to receive herein removable partition elements, to form a plurality of divided subcompartments in the lower housing section;

d) a plurality of partition elements adapted to be placed by the user in the elongates slotted openings, to provide for the desired subdivision of the first housing section, to form a plurality of divided compartments therein;

e) nesting-stop means on the internal wall surfaces of the first and second housing sections, to provide a defined nesting space for the storage of the partition elements between the surfaces of the nested sections; and f) break-away retaining means, to include a plurality of hingedly connected break-away plastic tabs, the tabs adapted to extend from one of the housing sections and to secure the other housing section, to permit the housing sections to be retained together in a paired, nesting relationship and adapted to be broken away by the user when the first and second housing sections are removed from the nesting relationship.

16. In combination a plurality of retained, nested, first and second housing sections of claim 15, in a vertically stacked arrangement between the vertically stacked pairs.

17. A multiple-media storage container for the storage of a plurality of media elements therein, which storage container comprises:

a) a first lower and a second upper, plastic, molded housing section, each section having a bottom surface and generally upright, outwardly tapered sides and front and back ends, each forming an open tray-like structure;

b) means to secure together the first and second housing sections, to form an enclosed, box-like, storage container for the storage of media elements therein;

c) the first and second housing sections configured and adapted to be nested together, one within the other, as a pair of first and second housing sections;

d) the first lower housing section having a bottom surface characterized by a plurality of slotted openings therein adapted to receive, within the slotted openings, removable partition elements, to form a plurality of divided compartments to receive media elements; and e) a break-away retaining means, to retain a pair of first and second housing sections in a nested, stacked, paired arrangement, the retaining means, the retaining means comprising a plurality of hingedly connected, plastic molded tab elements extending from the edge of one or the housing elements and adapted to be broken away from such edge, and the tab having another end adapted to be snapped onto the other housing section to retain the first and second housing sections in a nested, stacked arrangement.

18. The container of claim 17 wherein the tab elements are secured to the upper edge on either side of the lower first housing section, and which ave a snap-on clamp on the other end thereof and are hingedly connected and adapted to snap on the upper edge of the nested, second housing section, the tab adapted to be broken away from the edge of the first lower housing section, after removal of the selected nested pair.

19. In combination a plurality of the nested, retained pairs of the first and second housing sections of claim 17, the pairs arranged in a vertically stacked, multiple-pair, nested arrangement.

20. The container of claim 17 wherein the first and second housing sections comprise a peripherally extending skirt element about the upper edge of the first lower housing section, and a downwardly extending peripheral skirt element about the upper edge of the upper housing section, and wherein the first housing section has a bottom surface characterized by a plurality of generally uniform, spaced-apart, parallel first and second slotted openings, which first slotted openings extend substantially from the front to the back ends, and the second slotted openings extend substantially from one to the other sides, the first and second slotted openings generally perpendicular to each other and to the respective sides of the first lower housing section.

21. The container of claim 16 wherein the means to secure together the first and second housings comprises a hinge means, to place the first and second housing sections in a hinged relationship and adapted to move between an open and a closed position, and clasping means to secure together the hinged housing sections in a closed storage position.

22. The container of claim 17 which includes nesting-stop means within the first or second or both of the housing sections, to provide for a predetermined stop and nesting and a space between the first and second housing sections, when placed in a nesting relationship.

23. The container of claim 17 which includes a plurality of thin, removable, partition elements adapted to be placed in the elongated, slotted openings and placed within the space between the first and second housing sections in the nesting relationship.

24. The container of claim 1 wherein the plurality of first and second slotted opening define a plurality of generally rectangular areas extending form the front to back ends of the lower housing section and a plurality of generally square areas extending on either side of the rectangular areas.

25. The container of claim 1 wherein the retaining means comprises a pair of hingedly connected, break-away, plastic tab elements, each tab element generally opposingly positioned on opposite sides of the first lower housing and each tab element having a one end which is mechanically weakened and hingedly connected to an upper edge of the front lower housing section and having another end with a snap-in clamp section to permit the tab element to snap fasten against an upper edge of the second housing section wherein the first and second housing sections are in a nested relationship to retain the said sections together.

* * * * *

UNITED STATES PATENT AND TRADEMARK OFFICE
CERTIFICATE OF CORRECTION

PATENT NO. : 5,265,725

DATED : November 30, 1993

INVENTOR(S) : Thomas W. Judd and Jon Rossman

It is certified that error appears in the above-identified patent and that said Letters Patent is hereby corrected as shown below:

Claim 12, column 7, lines 67-68, delete "compartment" and insert --compartments--.

Claim 15, column 8, line 13, delete "molding" and insert --molded--.
line 24, delete "herein" and insert --therein--.
line 29, delete "elongates" ard insert --elongated--.

Claim 16, column 8, lines 49-50, delete "between the vertically stacked pairs".

Claim 17, column 8, line 60, delete "enclosed, box-like," and insert --enclosed box-like--.
column 9, line 5, delete "the retaining means".
line 7, after "plastic" insert --,--.
line 8, after "one" delete "or" and insert --of--.
line 11, after "section" insert --,--.

Claim 18, column 9, line 16, delete "ave" and insert --have--.

Claim 21, column 10, line 3, delete "16" and insert --17--.

Claim 22, column 10, line 13, after "nesting" delete "and a".

UNITED STATES PATENT AND TRADEMARK OFFICE
CERTIFICATE OF CORRECTION

PATENT NO. : 5,265,725
DATED : November 30, 1993
INVENTOR(S) : Thomas W. Judd and Jon Rossman It is certified that error appears in the above-indentified patent and that said Letters Patent is hereby corrected as shown below:

Claim 24, column 10, line 20, delete "1" and insert --17--

Signed and Sealed this

Fourteenth Day of June, 1994

Attest:

BRUCE LEHMAN

*Attesting Officer*    *Commissioner of Patents and Trademarks*